United States Patent

Odegard et al.

[11] Patent Number: 5,804,328
[45] Date of Patent: Sep. 8, 1998

[54] CURRENT COLLECTING DEVICE FOR A FUEL CELL STACK

[75] Inventors: Rolf Odegard, Trondheim; Roald Ravnanger, Hauglandshella; Per Sundal, Solheimsviken, all of Norway

[73] Assignee: Den norske stats ol jeselskap a.s, Stavanger, Norway

[21] Appl. No.: 750,973

[22] PCT Filed: Jun. 28, 1995

[86] PCT No.: PCT/NO95/00114

§ 371 Date: Mar. 24, 1997

§ 102(e) Date: Mar. 24, 1997

[87] PCT Pub. No.: WO96/00987

PCT Pub. Date: Jan. 11, 1996

[30] Foreign Application Priority Data

Jun. 30, 1994 [NO] Norway ..................................... 942479

[51] Int. Cl.$^6$ .................................................. H01M 8/02
[52] U.S. Cl. .................................. 429/32; 429/31; 429/34
[58] Field of Search .................................. 429/34, 31, 32, 429/164, 211, 244

[56] References Cited

U.S. PATENT DOCUMENTS

| 4,719,157 | 1/1988 | Tsutsumi et al. | 429/34 |
| 4,791,035 | 12/1988 | Reichner | 429/31 |
| 5,387,476 | 2/1995 | Koch et al. | 429/12 |

OTHER PUBLICATIONS

Patent Abstracts of Japan, vol. 14, NO. 192, (C–711), abstract of JP, A, 2–37669, Feb. 7, 1990.

*Primary Examiner*—M. Nuzzolillo
*Attorney, Agent, or Firm*—Foley & Lardner

[57] ABSTRACT

A current collecting device for a fuel cell stack comprising a number of stack-forming fuel cell plates between opposite end plates, each end plate being connected to a current collector. The current collector comprises a plate having one surface pressed against the associated end plate and being provided with a number of grooves extending across the a substantial part of the area of the plate. Wires are received in the grooves. The wires are covered with a layer of a noble metal that projects above the surface of the associated end plate and forms an electrical connection between the wires and the end plate.

12 Claims, 3 Drawing Sheets

CURRENT COLLECTING DEVICE FOR A FUEL CELL STACK

BACKGROUND OF THE INVENTION

1. Field of the Invention

The invention relates to a current collecting device for a fuel cell stack comprising a number of stack-forming fuel cell plates between opposite end plates, each end plate being connected to a current collector.

In order to be able to make use of the electricity generated in a fuel cell stack in the best possible manner, it is necessary to have a current collector wherein the voltage loss is low when current is tapped. One must then have a good electrical contact between the end plates and the current collector of the fuel cell stack, at the same time as the ohmic voltage loss through the current conductor to the terminals is low.

2. Description of Related Art

A current collecting device of the introductorily stated type is known from U.S. Pat. No. 4,719,157. In this known device, the end plates are insulated from the current collector by means of a heat resisting insulator arranged therebetween, each of the current collectors comprising a plurality of independent current collecting sections which are spaced from each other and of which each is provided with a single terminal extending therefrom through the insulator and the end plate. An object of the known device is to provide a device having a high current collecting efficiency even if it is applied to a fuel cell assembly with a large electrode area.

Even if it is not stated in the patent specification, it is supposed that the device has appeared in connection with phosphorous acid fuel cells or melting carbonate fuel cells having an operating temperature of 200° C. and 600° C., respectively. Both of these fuel cell types have metallic connection elements and large electrode areas (1000–3000 $cm^2$). For solid-state oxide fuel cells (SOFC), having an operating temperature of approximately 1000° C., the posing of the problem is quite another one. In these fuel cell stacks, the connection elements are ceramics, and the electrode area is relatively large (100–500 $cm^2$). Current conductors for output of current from the stack can hardly be welded to the ceramic end plates. One therefore has to establish contact with the current conductor in another manner.

Several metals and metal alloys have a high electrical conductivity at 1000° C. However, in the oxidizing atmosphere there is formed a thin, non-conducting oxide layer on the surface. This oxide layer protects the metal or the metal alloy against further corrosion, but prevents an efficient current collection since it is electrically insulating. Consequently, it is no solution to use a high-temperature metal alloy directly against ceramic end plates in a fuel cell stack. Noble metals are resistant materials where there is not formed any oxide layer in air. However, the price of noble metals entails that it is not of current interest to use noble metals alone as current collectors. In addition, noble metals are ductile materials and therefore do not have the mechanical strength which is desirable for the total current collecting device.

BRIEF DESCRIPTION OF THE INVENTION

It is therefore an object of the invention to provide a current collecting device, especially for high temperature fuel cells with ceramic end plates, by which there is established and maintained a good electrical contact, and therewith a high electrical conductivity, between the fuel cell stack and the current collector at the operating temperature.

Another object of the invention is to provide such a current collecting device which is chemically stable in a given atmosphere at the operating temperature.

An additional object of the invention is to provide a current collecting device of the topical type which is arranged for possible adjustable compression of the fuel cell stack with associated end plates, in order to avoid high mechanical loads and secure optimum electrical contact conditions at the operating temperature.

For the achievement of the above-mentioned objects there is provided a device of the introductorily stated type which, according to the invention, is characterized in that the current collector comprises a plate which, with one surface, is pressed against the associated end plate, said surface being provided with a number of grooves extending across a substantial part of the area of the plate and receiving respective electric wires collected in at least one line bundle, the wires in the grooves being covered by a layer of noble metal projecting somewhat above the grooves and forming an electrical connection between the line wires and the end plate in question.

An advantageous embodiment of the device is characterized in that it comprises a force-exerting means allowing heat expansion of the fuel cell stack and providing for compression of the stack with associated end plates with a desired force at the operating temperature.

The invention will be further described below in connection with exemplary embodiments with reference to the drawings, wherein

DETAILED DESCRIPTION OF THE INVENTION

Figure 1:
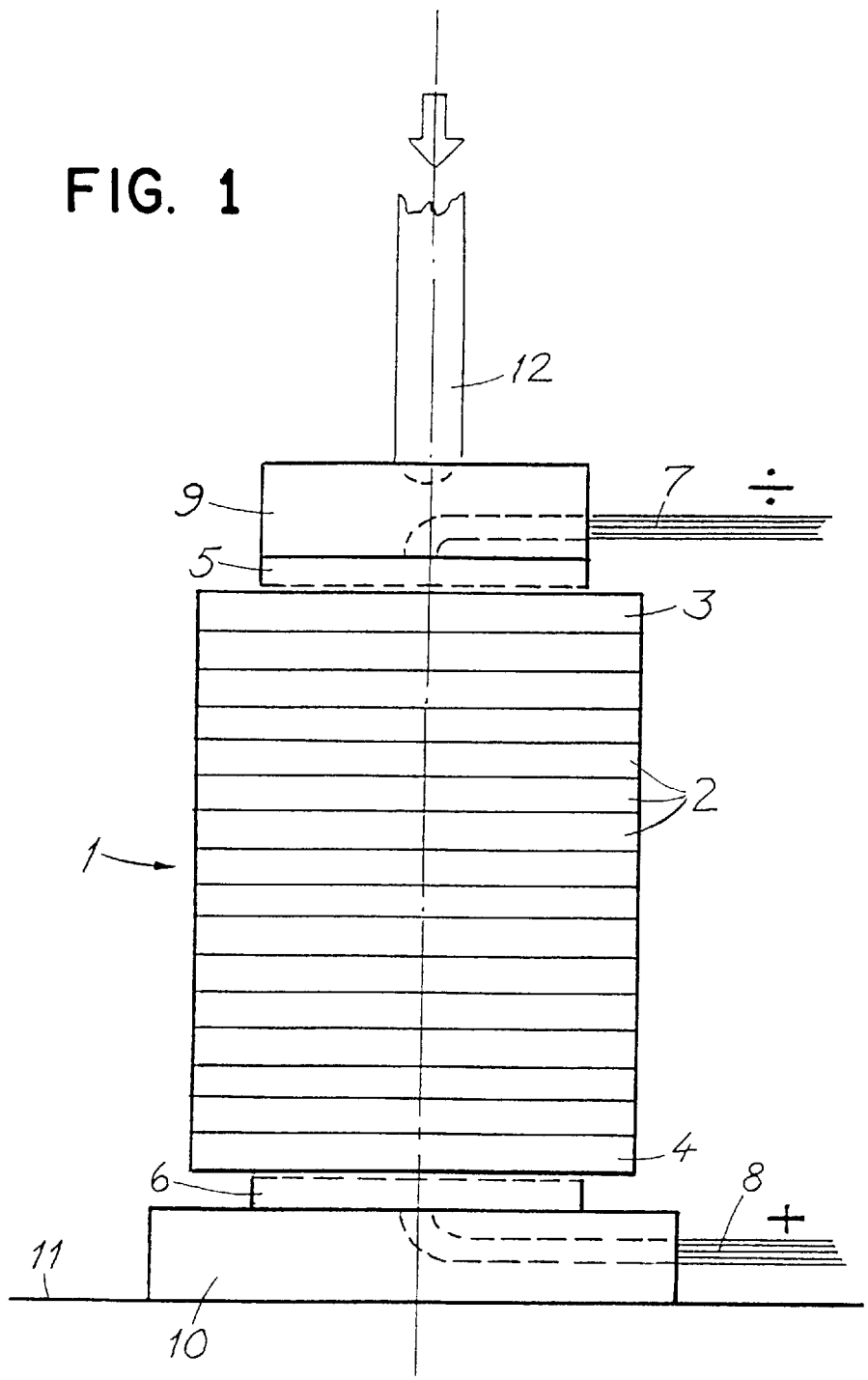
FIG. 1 shows a schematic side view of a fuel cell stack comprising a current collecting device according to the invention.
Figure 2:
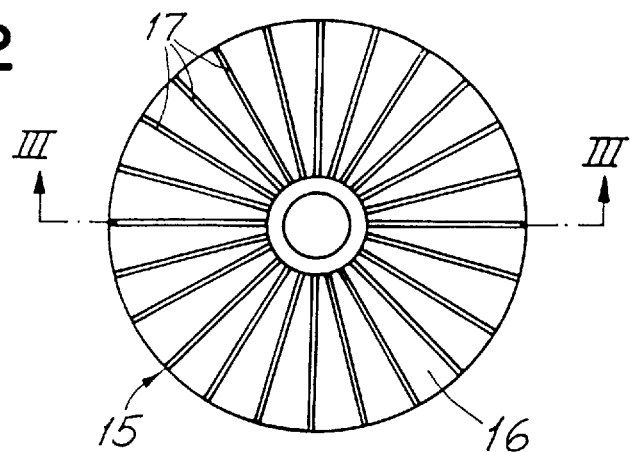
FIG. 2 shows a plan view of an embodiment of a current collecting plate in a device according to the invention.
Figure 3:
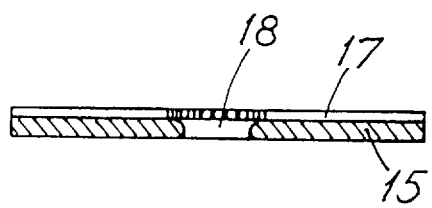
FIG. 3 shows a section along the line III—III in FIG. 2.

In the schematic view in FIG. 1 there is shown a fuel cell stack 1 consisting of a number of fuel cell plates 2 which are stacked on each other between a pair of end plates, more specifically a top plate 3 and a bottom plate 4. The end plates here are presupposed to consist of a conductive ceramic material, since it is the question of a solid-state oxide fuel cell for high temperature, i.e. for an operating temperature of approximately 1000° C. In electrically conducting connection with each of the plates 3 and 4 there is arranged a respective current collector 5 and 6, respectively, which, in the illustrated embodiment, corresponds to the embodiment according to FIGS. 2–5. From each current collector there goes out a current conductor bundle 7 and 8, respectively, which is carried through a suitable passage in an associated end block 9 and 10, respectively.

In the illustrated embodiment the fuel cell stack 1 rests on a support 11, and above the fuel cell stack there is arranged a pressure-exerting means 12 compressing the plate elements in the stack with a suitably chosen force. The pressure-exerting means 12 advantageously may be a hydraulic or pneumatic device, but alternatively may consist of e.g. a spring or a weight. This means provides for electrical contact and for sealing in the stack, and in addition it permits heat expansion of the stack and sees to it that the current collectors are pressed against the end plates with a desired force, both at start-up and at achieved operating temperature. This is essential in order to avoid accumulation of unfortunate or harmful mechanical stresses when heating to operating temperature, and in order to secure optimum electrical contact conditions.

Figure 4:
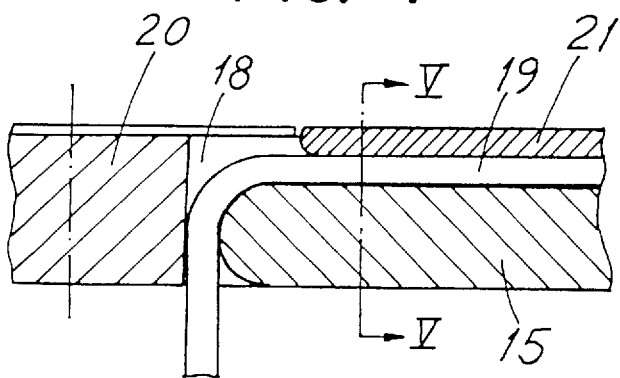
FIG. 4 shows an enlarged sectional view of a central portion of the plate in FIGS. 2–3.

An embodiment of a current collecting device according to the invention is shown in FIGS. 2–5. As shown, the current collector comprises a circular flat plate 15 which, with one surface 16, is intended to be pressed against an end plate 3 or 4 in the fuel cell stack 1, and then with a suitable force as mentioned above. The surface 16 is provided with a plurality of grooves 17 extending radially from a central opening 18 in the plate to the periphery of the plate. As shown in FIG. 4, in the grooves 17 there are placed electric current conductors or line wires 19 which are carried trough a central opening 18 and thereafter are collected to a line bundle which is carried away from the plate like the line bundles 7 and 8 in FIGS. 1. As further shown in FIG. 4, the plate 15 is rounded in the opening 18, for gentle bending of the line wires 19. In the opening 18 there is placed a conical plug 20 for tension relief of the line wires.

Figure 5:
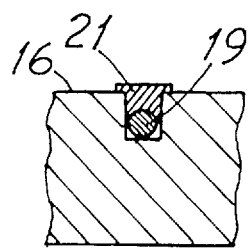
FIG. 5 shows a partial section along the line V—V in FIG. 4.

As appears from FIGS. 4 and 5, the wires 19 in the grooves 17 are covered by a layer 21 of noble metal projecting somewhat above the grooves, i.e. above the surface 16 of the plate, and which protect the wires against oxidation and form an electrical connection between the line wires 19 and the end plate in question in the fuel cell stack, i.e. the plate 3 or 4 in FIG. 1. In the illustrated embodiment, the layers of noble metal are formed from flat-pressed wires of the topical metal. Advantageously, the noble metal may be platinum.

The line wires 13 are of a suitable metal alloy, and may for example be of so-called APM quality, i.e. an alloy which, in an oxidizing atmosphere, forms a thin, stable, non-conducting oxide layer on its surface. The APM wires are also mechanically flexible.

The number of APM wires and platinum wires may vary. The cross-section of the APM wires may also vary. An increase of the cross-section will reduce the voltage drop when current flows through the wires. The material in the plate 15 itself preferably is of the same quality as in the line wires 19, and the plate and the relief plug 20 are also preferably of the same material. The plate functions only as a support and guide for the line wires and the noble metal wires. In that the current output takes place via line wires which are mechanically flexible, unfortunate mechanical stresses on the fuel cell stack during operation are avoided.

In the illustrated embodiment with radial grooves in the current collecting plate, the grooves have the same width and length, and receive equally long lengths of line wire. As will be appreciated, a similar arrangement, with essentially equally long grooves and equally long line wires, may also be achieved with another groove arrangement than radially extending grooves, at the same time as a substantially central opening for line wire lead-through is retained.

Figure 6:
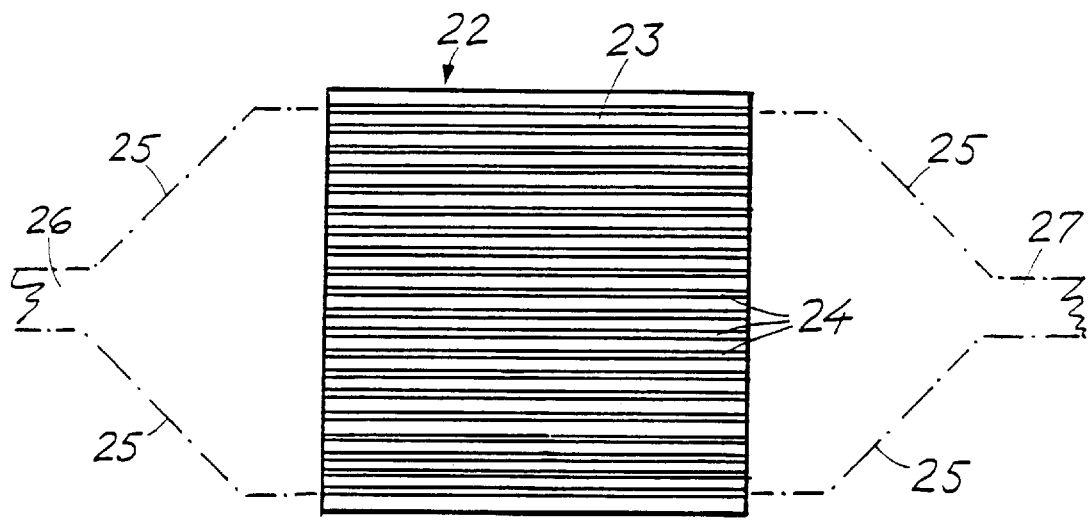
FIG. 6 shows a plan view of another embodiment of a current collecting plate.
Figure 7:
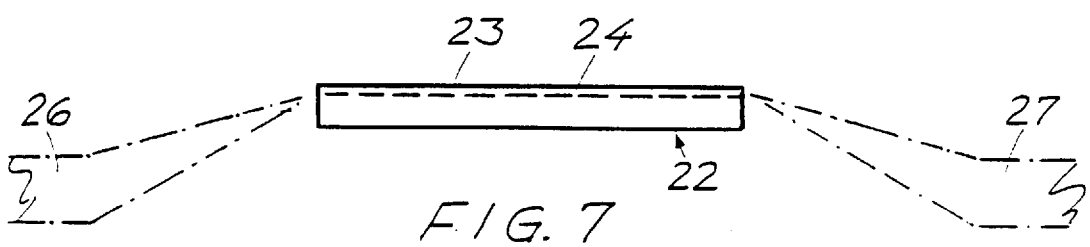
FIG. 7 shows a side view of the current collecting plate in FIG. 6.

Another embodiment of a current collecting plate 22 is shown in FIGS. 6 and 7. In this embodiment the plate 22 is rectangular and on one surface 23 is provided with a number of essentially parallel grooves 24 extending between opposite side edges of the plate. The grooves receive line wires 25, and in the illustrated embodiment these are collected in two groups of line wires which are carried to a separate side of the plate where they are collected in a respective line bundle 26 and 27, respectively. In other respects, the arrangement of line wires and protective layers of noble metal may be similar to the embodiment according to FIGS. 2–5, and therefore reference is made to the previous description thereof.

We claim:

1. A current collecting device for a fuel cell stack including a number of stack-forming fuel cell plates between opposite end plates, the current collecting device comprising: having a surface pressed against an associated end plate, said surface being provided with a number of grooves extending across a substantial part of the area of the plate and receiving respective electric wires from at least one bundle, the wires in the grooves being covered by a layer of noble metal projecting above the grooves and forming an electrical connection between the wires and the associated end plate.

2. A device according to claim 1, further comprising: a force-exerter allowing heat expansion of the fuel cell stack and compressing the fuel cell stack with a desired force at the operating temperature.

3. A device according to claim 2, wherein the force-exerter is hydraulically or pneumatically driven.

4. A device according to claim 1, wherein each of the grooves is essentially the same width and the same length, and each groove receives substantially the same length of wire.

5. A device according to claim 1, wherein the grooved plate has a centrally disposed opening and grooves extending radially out from the opening, the respective wires being received from the bundle through the opening.

6. A device according to claim 5, further comprising: a tension relief plug in the opening resting against the wires.

7. A device according to claim 6, wherein the tension relief plug and the grooved plate are manufactured from the same material.

8. A device according to claim 1, wherein the grooved plate comprises a number of essentially parallel grooves, and the at least one bundle is spaced apart from the grooved plate.

9. A device according to claim 1, wherein flattened lengths of the noble metal form the covering layer.

10. A device according to claim 1, wherein the noble metal is platinum.

11. A device according to claim 1, wherein the grooved plate is formed from a same metal material as the wires.

12. A device according to claim 11, wherein the metal material forms a non-conducting oxide layer on its surface in an oxidizing atmosphere.

* * * * *